Patented Dec. 16, 1924.

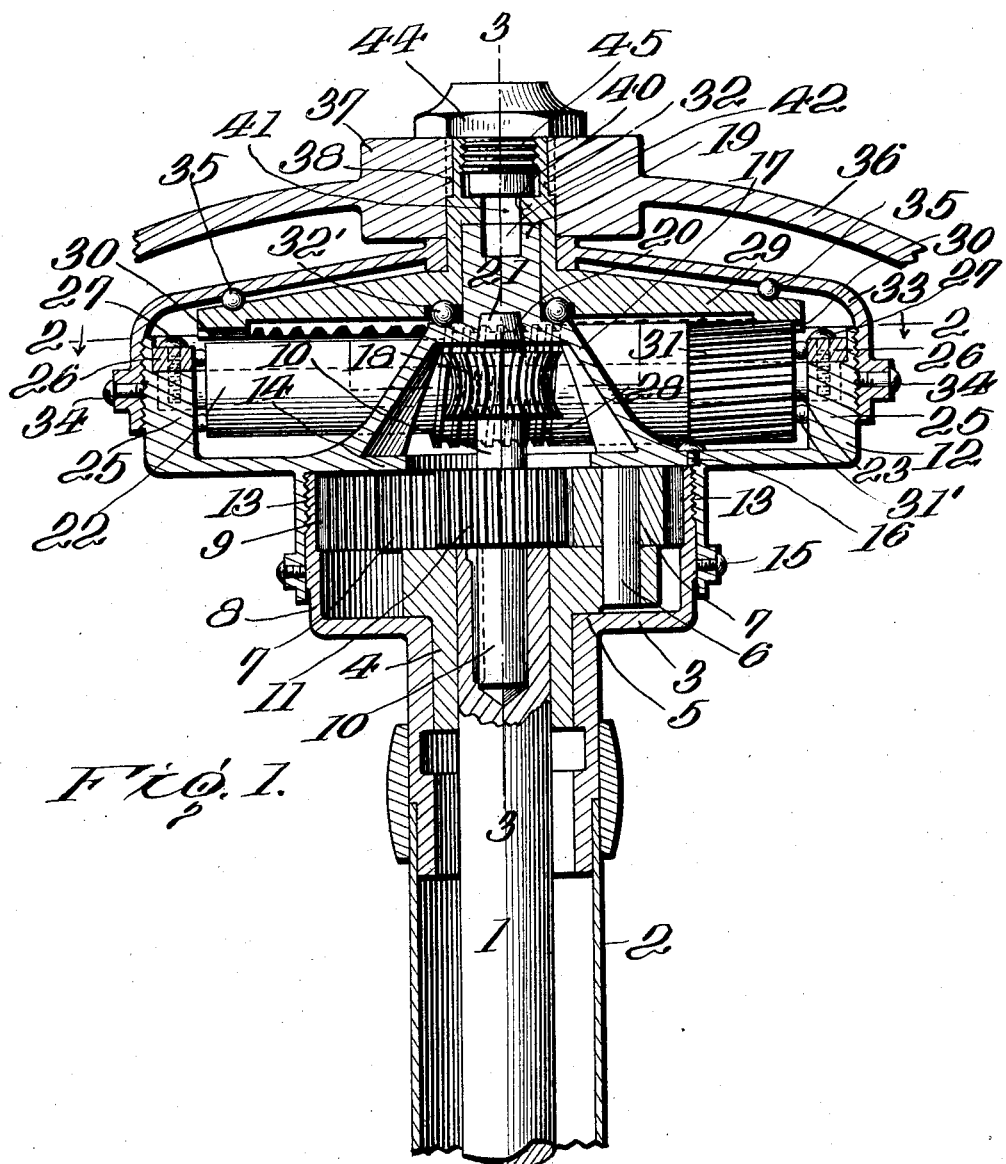

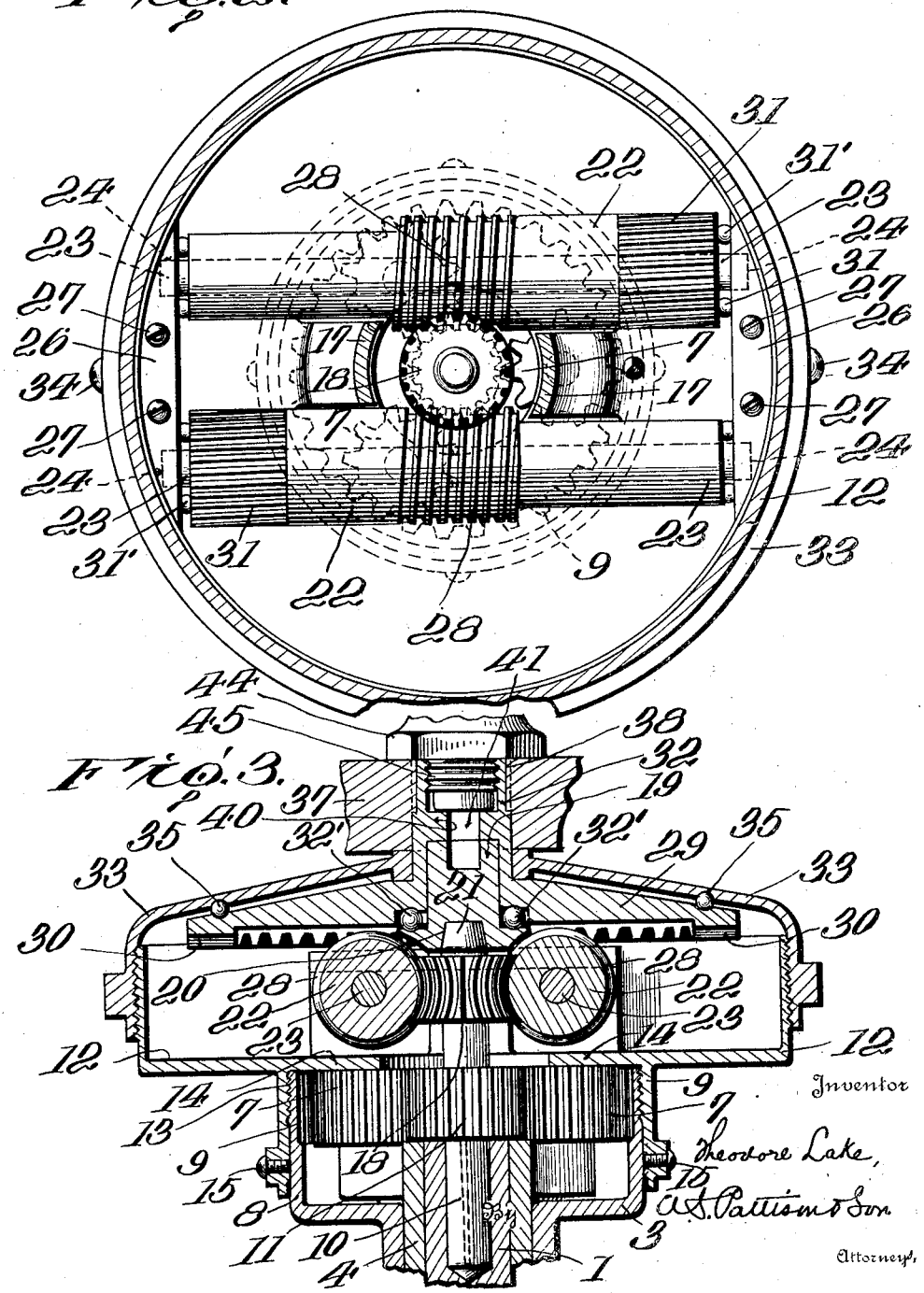

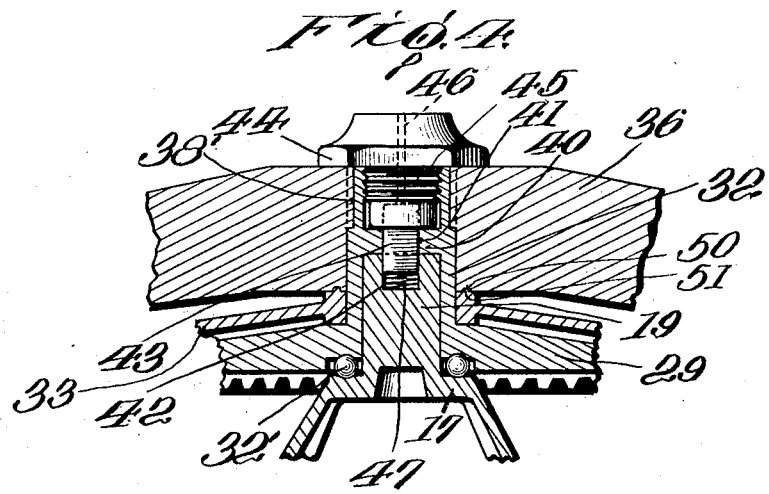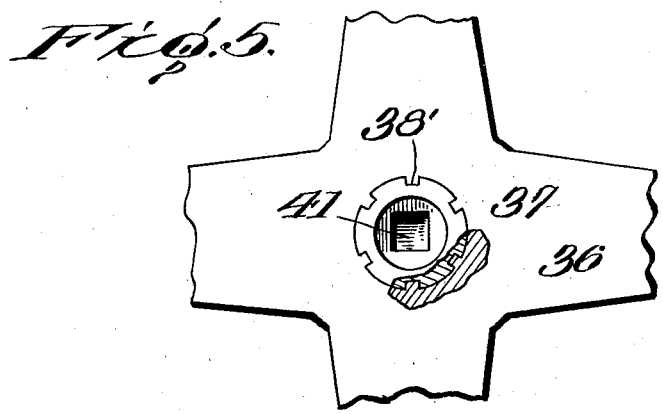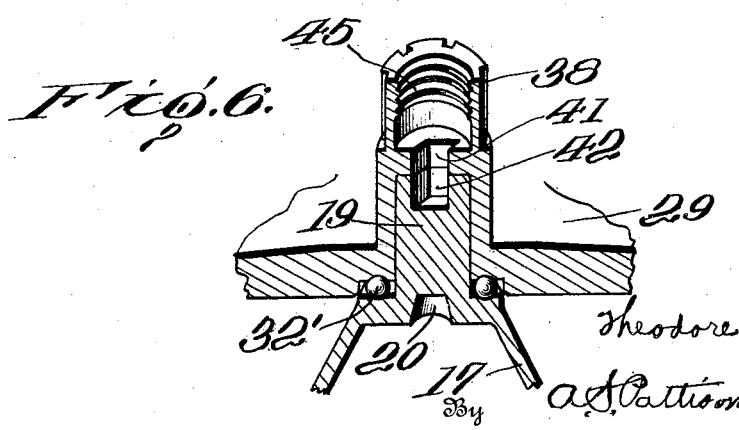

1,519,849

UNITED STATES PATENT OFFICE.

THEODORE LAKE, OF TORONTO, KANSAS, ASSIGNOR OF ONE-HALF TO OTIS RAY VAN CLEVE, OF TORONTO, KANSAS.

AUTOMOBILE SAFETY STEERING DEVICE.

Application filed January 19, 1923. Serial No. 613,724.

*To all whom it may concern:*

Be it known that I, THEODORE LAKE, a citizen of the United States, residing at Toronto, in the county of Woodson and State of Kansas, have invented certain new and useful Improvements in Automobile Safety Steering Devices, of which the following is a specification, reference being had therein to the accompanying drawing.

This invention relates to improvements in automobile safety steering devices, and is more particularly adapted for use in connection with the steering mechanism of a Ford automobile.

It is well-known that the present Ford steering equipment permits the steering wheel to be moved through power being applied to the front wheels of the car, as by rough and irregular road conditions, or objects encountered by either of the front wheels while the car is traveling, which makes the steering gear objectionable and dangerous in that the steering wheel is liable to be suddenly jerked from the grasp of the operator.

The primary object of my invention is to provide a mechanism attachable to a Ford steering gear which will hold the steering wheel in the position in which it is placed, and will prevent it from being moved or influenced by the front wheels of the automobile hitting objects in their path of travel, or moved in any other manner whatever, except through revolving the steering wheel.

Another object of the present invention is to accomplish the foregoing results by an attachable mechanism involving a worm-gear, whereby a Ford steering mechanism will be locked in substantially the same manner as other forms of worm-gears used in the larger automobiles.

A further object of my invention is to provide a lock especially adapted for the construction of my invention, thus preventing the car from being controlled through the steering wheel.

With these and other objects in view, this invention consists in certain constructions and arrangements of parts to be hereinafter fully described.

In the accompanying drawings:—

Figure 1 is a vertical central sectional view of a Ford steering gear with my invention applied thereto.

Figure 2 is a cross-sectional view on the line 2—2 of Fig. 1, looking in the direction indicated by arrow in Fig. 1.

Figure 3 is a cross-sectional view taken at right angles to Fig. 1.

Figure 4 is a central vertical sectional view through a portion of the steering wheel and its co-operating operative parts, showing a lock for the device.

Figure 5 is a top plan view of the steering wheel.

Figure 6 is a perspective view of the parts which receive the steering wheel.

Referring now to the drawings, 1 indicates a shaft of a Ford steering mechanism, which is connected with the front wheels in a manner not shown, but well understood by those skilled in the art. Surrounding the shaft 1 is a tube 2 to the upper end of which tube 2 is suitably attached the lower end of the gear housing 3. The shaft 1 projects into the housing 3 and is surrounded by a collar 4, which has a shoulder 5 resting upon the bottom of the housing 3. This collar 4 carries three pins 6, which project above the collar and upon which the pinions 7 are journaled. The inner side of the vertical wall 8 of the housing 3 is provided with internal gear teeth 9, with which the pinions 7 are in mesh. Journaled in the upper end of the shaft 1 is a vertical shaft 10, and this shaft 10 carries intermediate its ends a pinion 11, which meshes with the inner sides of the pinions 7. My shaft 10 replaces the usual shaft and pinion common to the well-known Ford steering mechanism which mechanism thus far I have described, with the exception of the shaft 10 just mentioned.

My present improvement comprises a second housing 12, which has a downwardly extending flange collar 13 that embraces the Ford housing 3. This collar and the housing 3 are screw-threadedly attached as shown, and suitable set-screws 15 pass through the collar and engage the vertical wall of the housing 3 for locking them against rotation. It will be observed that the housing 12 is preferably larger in diameter than the housing 3, and the housing 12 is provided with an inwardly extending and projecting flange 14, for holding the Ford pinions in position, by engaging their upper faces. The said collar 13 and the vertical wall 8 are still further locked by means of a screw 16, which passes through the wall of the housing 12 into the upper end of the housing 3. In my construction the bottom of the housing 12 is provided with an upwardly extending bridge 17, the said bridge being located as shown in Fig. 2, so as not to interfere with the mechanism in the housing which will be presently described. The shaft 10 extends upward beyond the gear 11 and carries on its upper end a worm-gear 18. Projecting upward from the center of the bridge 17 is a shaft 19, and the bottom of the said shaft has a cavity 20, which receives the upper extremity of the shaft 10 as at 21.

Located within the housing 12, at opposite sides of the worm-gear 18, are two horizontal cylindrical members 22. These members are hollow and passing through them are shafts 23, the ends of the shafts being seated in suitable recesses 24, which are made in the extensions 25, at opposite sides of the housing 12. The ends of the shafts 23 are held in place by plates 26, which are held by suitable screws 27. These members 22 are each provided with intermediate worm-gears 28 which mesh with opposite sides of the worm-gear 18.

A suitable horizontal disk 29 is located above the members 22, the under periphery of the disk being provided with downwardly projecting gear teeth 30, which engage with the gears 31 located on the opposite ends of the members 22. The gear teeth 31 are cut so as to adjust their off center position and the gear teeth 30 are cut to mesh properly with them. Since the members 22 are subjected to end-thrusts in opposite directions, I locate ball-bearings 31′ between their ends and the blocks 25, which will receive the end-thrusts. This disk 29 revolves upon suitable ball-bearings 32′ and is provided with a central upwardly extending sleeve 32, which surrounds the shaft 19. As shown, this sleeve 32 projects above the upper end of shaft 19. A housing top 33 for the housing 12, is provided and its periphery embraces the outer side of the housing 12 and is united thereto screw-threadedly as at 33′, and the screws 34 pass through the top and bear against the housing to lock it against rotation. As shown, this housing top 33 is outside of the disk 29 and for the purpose of holding the disk in its proper position and having it free in its movement and to accommodate any possible tendency of the disk binding against the housing top, there is provided between the disk and the housing top a ball-bearing 35.

The steering wheel 36 has its hub portion 37 fitting around the sleeve 32 of the disk 29, the said steering wheel and the sleeve being suitably locked together by key-ways 38, as clearly appears in Figs. 5 and 6 of the drawings. For the purpose of holding the steering wheel in position, it is surrounded by a nut 39, which screws upon the projecting end of the sleeve 32 and down upon the hub 37. In this manner the steering wheel is locked to the sleeve 32.

It will be observed that when the steering wheel is attached to the sleeve 32 the shoulders of the opening in the housing top 33 will hold the disk and the steering wheel in proper position.

The operation of the mechanism just described is as follows:

When the steering wheel 36 is turned in either direction, it carries with it the disk 29 having the gear teeth 30, the latter being in engagement with the gears 31. This movement turns the members 22 which are provided with the worm-gears 28 that are in engagement with the worm-gear 18, which is fast to the upper end of the shaft 10. The said movement of the steering wheel 36 is thus conveyed to the shaft 10 and from the gear 11 to the pinions 7, from the pinions 7, to the collar 4, which latter is revolved, the said collar being suitably attached to the steering shaft 1, thus conveying the rotation of the steering wheel to the steering shaft 1. It will be observed that there is located intermediate the steering wheel 36 and the steering shaft the worm-gears 18 and 28, thus making a worm-steering gear which will hold the front wheels of the automobile against sudden movement by being struck by the unequalities of the road or by hitting an object, to the same extent as the ordinary worm steering gear mechanism.

It will also be observed that this device is capable of attachment to a Ford automobile in that it is only necessary to remove the top of the Ford automobile steering gear housing, remove the pinion and shaft of the Ford construction and replace it with my shaft 10 and its gears 11 and 18. Then my housing 12 fits the vertical wall 8 of the Ford housing and is adapted to receive the parts in the positions here shown, thus making a worm gear steering gear for a Ford automobile, the parts being placed in the housing 12 in proper sequence, that is to say, the members 22, the disk 29, the housing top 33 and then the steering wheel 36 of my device. The parts are then in position for operation.

The foregoing device is well constructed and is well adapted for a locking device in that the shaft 19 being a part of the bridge 17 is stationary, while the disk 29 and the steering wheel 36 revolve around it. In order to effect the locking of the parts so that the automobile cannot be controlled through the steering wheel, it is only necessary to lock the sleeve 32 to the shaft 19. In Fig. 4, I show a means for doing this.

It consists in providing the sleeve with a top portion 40 having a vertical angular opening 41 and making in the top of the shaft 19 an angular vertical cavity opening 42. A vertically movable angular rod or lock plunger 43 passes through the opening 41 and into the cavity 42. The nut 44 has an externally screw-threaded projection 45 which fits within the upper end of the sleeve 32 and carries a vertical key opening 46.

A vertical spiral spring 47 is located in the cavity 42 below the locking member or plunger 43, whereby the locking member will be forced upward to carry its lower end out of engagement with the cavity 42. By a suitable key, the locking plunger 43 will be forced downward into the angular cavity 42 and thus will lock the steering wheel to the rigid part 19, thus locking it against operating as a steering member.

The locking plunger 43 can be held in a locked downward position in any desired manner but the following way is suggested as one means of accomplishing this result. When the plunger lock 43 is pushed downwardly it may be held in locked position by horizontal arms passing under projecting shoulders when the key is pushed down and given a turn or twist. This arm member will have a central hub having a cut across its face into which the end of the key enters when inserted. This hub with opposing extending arms, will rest on the top end surface of the plunger and will not be attached thereto, thereby permitting it to turn freely on the plunger head. When it is desired to lock the plunger in a downward position the key is inserted and by pushing it down the arms, following guide-ways, are forced down thus forcing the plunger into cavity 42. When the key has reached its furthermost depth the guide-ways will then permit the turn of the arms, which will be done by turning the key to one side, by which the arms will be passed under a projecting shoulder. This is merely one of the suggested ways of locking the plunger down and other ways could be substituted for the above without departing from the spirit of the invention.

In Figs. 5 and 6 are shown the means for attaching the steering wheel 36 to the disk 29, which comprises the keys 38 fitting in the key-ways 38' of the steering wheel.

It will be observed by an examination of the drawings that by removing the set screws 34 and then un-screwing the housing top 33 it would be possible to remove as a unit the steering wheel, housing top and the disk gear 29, thereby permitting entrance to the mechanism whereby the entire device could be removed, with theft intent, and the regular Ford steering equipment substituted.

It will be noted that the lock plunger only prevents rotation of the steering wheel and would therefore be ineffective as a lock, when it is possible to divide the housing as mentioned, thus removing the entire device.

To prevent the removal of the unit spoken of above the following construction is used. When steering the automobile the gears regulating the same will be so timed that it will be unnecessary to make a complete revolution of the steering wheel in changing the direction of movement of the car from one extreme direction to the other. It will be seen that sleeve 32 with the attached steering wheel does not travel the entire circumference of the central opening in the housing top through which the sleeve passes. On the under side of the steering hub 37 I have provided a groove or cam-way 50 as clearly appears in Fig. 4 of the drawings. This groove or cam-way will follow the hub circle but will not completely encircle the hub, as a portion approximately one-half inch in length will not be grooved. On the upper shoulder surface of the central opening in the housing top 33 there will be provided a suitable projecting member 51 which will fit into the groove in the steering wheel hub. As the groove does not entirely encircle the hub, it will be seen that the housing top can not turn to a degree greater than formed by the groove and it therefore follows that if the set screws 34 of the housing 33 are removed the housing top can not be unscrewed unless the steering wheel has previously been removed.

Having thus described my invention, what I claim and desire to secure by Letters Patent is:—

1. An attachable steering mechanism for Ford automobiles, provided with a vertical gear, of a housing having a projecting shaft, transverse members journaled in said housing, said members carrying gears meshing with the said vertical gear, a disk gear journaled on the said vertical shaft, said disk gear meshing with end gears, said disk gear carrying a vertical sleeve surrounding said shaft, and a steering wheel operatively connected with the said sleeve.

2. An attachable worm-steering mechanism for Ford automobiles, comprising a vertical worm gear, a transverse housing provided with a bridge having a concentric vertically extending shaft, a transversely arranged member in the housing having an intermediate second worm-gear meshing with the said first worm-gear, said horizontal member having its end provided with a gear, a disk gear meshing with the last said gear, said disk gear having a vertical sleeve surrounding the said shaft, and a steering wheel connected with the said sleeve.

3. A steering mechanism for automobiles comprising a housing containing a centrally located bridge having an upwardly projecting shaft, a disk gear mounted on said shaft, gears operatively connected with a steering shaft, one of the said gears provided with a shaft having its upper end journaled in the bridge, and worm gears intermediate the disk gear and operatively connected to the said gears, the parts operating as described.

4. An adjustable worm steering mechanism for Ford automobiles, comprising a vertical worm gear, a transverse housing provided with a bridge having a concentric vertically extending shaft, a transversely arranged member in the housing having an intermediate second worm gear meshing with the first said worm gear, said horizontal member having its end provided with a gear, a disk gear meshing with the last said gear, and a steering wheel connected to the disk gear.

In testimony whereof I hereunto affix my signature.

THEODORE LAKE.